(12) United States Patent
Kikuchi

(10) Patent No.: US 12,429,589 B2
(45) Date of Patent: Sep. 30, 2025

(54) HAMMERING TEST SYSTEM

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 326 days.

(21) Appl. No.: 17/943,611

(22) Filed: Sep. 13, 2022

(65) Prior Publication Data
US 2023/0103063 A1 Mar. 30, 2023

(30) Foreign Application Priority Data
Sep. 30, 2021 (JP) ................. 2021-160658

(51) Int. Cl.
*G01S 17/42* (2006.01)
*G01B 11/24* (2006.01)
*G01C 15/00* (2006.01)
*G01M 5/00* (2006.01)
*G01M 7/08* (2006.01)
(Continued)

(52) U.S. Cl.
CPC .............. *G01S 17/42* (2013.01); *G01B 11/24* (2013.01); *G01C 15/002* (2013.01); *G01M 5/0075* (2013.01); *G01M 7/08* (2013.01); *G01N 29/045* (2013.01); *G05D 1/101* (2013.01)

(58) Field of Classification Search
CPC .................................................. G01N 29/045
See application file for complete search history.

(56) References Cited

U.S. PATENT DOCUMENTS 10,671,066 B2 * 6/2020 Hammond ........... G05D 1/0033
11,579,059 B2 * 2/2023 Miyake ................ G01N 29/265
2009/0301203 A1 12/2009 Brussieux
(Continued)

FOREIGN PATENT DOCUMENTS

JP 2001249117 9/2001
JP 2004-205216 A 7/2004
(Continued)

OTHER PUBLICATIONS

Related U.S. Appl. No. 17/943,593, filed Sep. 13, 2022.

*Primary Examiner* — Erika J. Villaluna
(74) *Attorney, Agent, or Firm* — Studebaker Brackett PLLC

(57) ABSTRACT

A hammering test system includes a hammering test device including a target, a flying unit, and a hammering test mechanism configured to conduct a hammering test on a test object, a surveying instrument including a scanner for acquiring point cloud data by scanning with scanning light, and configured to be capable of performing tracking and distance and angle measurements of the target, and an arithmetic processing unit including a point cloud data analyzing unit configured to calculate shape data by analyzing point cloud data acquired by the scanner, and a flight plan calculating unit configured to calculate a flight plan of the hammering test device based on the shape data calculated by the point cloud data analyzing unit, and the surveying instrument tracks the target of the hammering test device and makes distance and angle measurements when the hammering test mechanism conducts a hammering test.

11 Claims, 14 Drawing Sheets

(51) Int. Cl.
*G01N 29/04* (2006.01)
*G05D 1/00* (2006.01)

(56) References Cited

U.S. PATENT DOCUMENTS

| | | | |
|---|---|---|---|
| 2014/0371952 A1* | 12/2014 | Ohtomo | G05D 1/0094 |
| | | | 701/2 |
| 2018/0032088 A1 | 2/2018 | van Cruyningen | |
| 2018/0204469 A1* | 7/2018 | Moster | B64U 10/13 |
| 2019/0212304 A1 | 7/2019 | Yamashita et al. | |
| 2020/0378927 A1 | 12/2020 | Nishizawa et al. | |
| 2021/0064024 A1 | 3/2021 | Hammond et al. | |
| 2021/0116248 A1* | 4/2021 | Inotsume | G05D 1/102 |

FOREIGN PATENT DOCUMENTS

| | | |
|---|---|---|
| JP | 2011194937 | 10/2011 |
| JP | 2018-031661 A | 3/2018 |
| JP | 2018128278 | 8/2018 |
| KR | 20200143161 | 12/2020 |

\* cited by examiner

Ceiling surface

Inclined surface

Vertical surface

HAMMERING TEST SYSTEM

TECHNICAL FIELD

The present invention relates to a hammering test system capable of stably conducting a hammering test over a wide range.

BACKGROUND ART

A periodic test is conducted on a building to maintain safety. For example, in a concrete building, whether there is an abnormal portion such as cracking and floating inside the concrete is confirmed by conducting a hammering test in which an inspector inspects hammering sounds by hammering the concrete building with a hammer. A worker conducts a test not only by direct hammering with a hammer but also by attaching a test device to a tip end of an arm and extending the arm (Patent Literature 1).

CITATION LIST

Patent Literature

Patent Literature 1: Japanese Published Unexamined Patent Application No. 2004-205216

SUMMARY OF INVENTION

Technical Problem

However, a test object is a large-sized structure such as a building, a bridge pier, and a tunnel, and the length of an arm is limited.

The present invention was made in view of this problem, and provides a hammering test system capable of stably conducting a hammering test even in high places that are out of an inspector's reach.

Solution to Problem

In order to solve the problem described above, according to an aspect of the present disclosure, a hammering test system is configured which includes a hammering test device including a target, a flying unit, and a hammering test mechanism configured to conduct a hammering test on a test object, a surveying instrument including a scanner for acquiring point cloud data by scanning with scanning light, and configured to be capable of performing tracking and distance and angle measurements of the target, and an arithmetic processing unit including a point cloud data analyzing unit configured to calculate shape data by analyzing point cloud data acquired by the scanner, and a flight plan calculating unit configured to calculate a flight plan of the hammering test device based on the shape data calculated by the point cloud data analyzing unit, wherein the surveying instrument tracks the target of the hammering test device and makes distance and angle measurements at a timing synchronized with a timing of conducting a hammering test by the hammering test mechanism.

According to this aspect, a flight plan can be calculated by grasping a shape of a test object by the scanner, and the test device can be caused to automatically fly and conduct a hammering test. Further, an accurate position and posture of the hammering test device can be grasped, and a hammering test position can also be accurately grasped.

According to an aspect, the flight plan calculating unit sets test points to be subjected to a hammering test at intervals of a predetermined distance on a surface of the shape data, and calculates a flight plan in which a hammering test is conducted thoroughly on a surface of the test object. According to this aspect, based on the flight plan, a test object can be automatically tested thoroughly.

According to an aspect, the arithmetic processing unit includes a hammering test post-processing unit configured to process a hammering test result obtained by the hammering test device into visually recognizable information based on the shape data calculated by the point cloud data analyzing unit and data acquired by distance and angle measurements made by the surveying instrument. An abnormal portion can be visualized based on a test result together with the shape data of the test object.

Advantageous Effects of Invention

As is clear from the above description, according to the present invention, a hammering test system capable of stably conducting a hammering test even in high places is provided.

BRIEF DESCRIPTION OF DRAWINGS

FIG. 4A is a side view of a hammering test device. FIG. 4B is a bottom view of a hammering test device.

FIG. 6A illustrates a landing state when a landing surface is a ceiling surface. FIG. 6B illustrates a landing state when a landing surface is an inclined surface. FIG. 6C illustrates a landing state when a landing surface is a vertical surface.

DESCRIPTION OF EMBODIMENTS

Hereinafter, detailed embodiments of configurations of the present disclosure will be described with reference to the drawings. Embodiments are not intended to limit the invention but are examples, and all features and combinations thereof described in the embodiments are not always essential to the invention. Components having the same configurations are provided with the same reference signs, and overlapping description thereof will be omitted.

(Hammering Test System)

Figure 1:
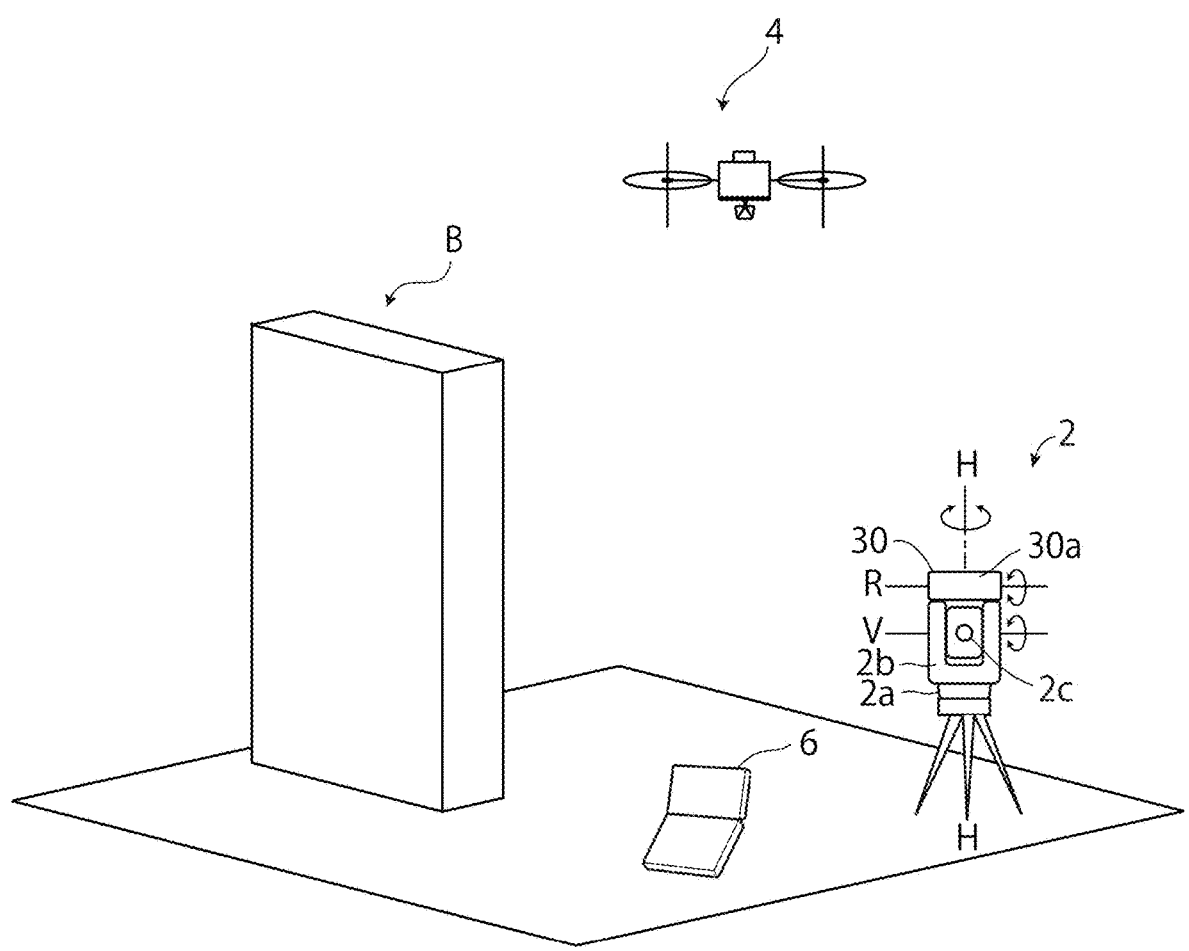
FIG. 1 is a schematic configuration view of a hammering test system according to a preferred embodiment.

FIG. 1 is a schematic configuration view of a hammering test system 1 according to a preferred embodiment of the present invention, and illustrates a work image at a test site. The hammering test system 1 according to the present embodiment includes a hammering test device 4, a surveying instrument 2, and a processing PC(computer) 6. The processing PC 6, the surveying instrument 2, and the hammering test device 4 are connected to each other, and can transmit and receive information to and from each other.

The hammering test device 4 is a UAV (Unmanned Air Vehicle) capable of autonomously flying such as a multicopter. The hammering test device 4 is automatically or manually controlled according to an input flight plan (flight program). The hammering test device 4 moves to a test position by itself, and conducts a hammering test. To the hammering test device 4, a target T is attached.

The surveying instrument 2 is a three-dimensional scanner-equipped total station. The surveying instrument 2 has an automatic tracking function, a distance and angle measuring function, and a scanning function. The surveying instrument 2 is configured to acquire three-dimensional point cloud data of the entire circumference by scanning the entire circumference with scanning light. In addition, the surveying instrument 2 performs tracking and distance and angle measurements of the target T.

The processing PC 6 is installed at a site where a test object B is located. The surveying instrument 2, the hammering test device 4, and the processing PC 6 are wirelessly connected to each other (may be connected by wire), and can transmit and receive information to and from each other.

The surveying instrument 2 is installed on a reference point center by using a tripod. The surveying instrument 2 scans the test object B to acquire three-dimensional point cloud data. The processing PC 6 performs various arithmetic processes such as calculation of three-dimensional shape data from the acquired three-dimensional point cloud data and calculation of a flight plan including test points to be subjected to a hammering test.

(Surveying Instrument 2)

As described above, the surveying instrument 2 is a three-dimensional scanner-equipped total station, and as illustrated in FIG. 1, includes a base portion 2a provided on a leveling device, a bracket portion 2b that rotates horizontally around an axis H-H on the base portion 2a, and a telescope 2c that rotates vertically around an axis V-V at a center of the bracket portion 2b, and further includes a scanner 30 on an upper portion.

Figure 2:
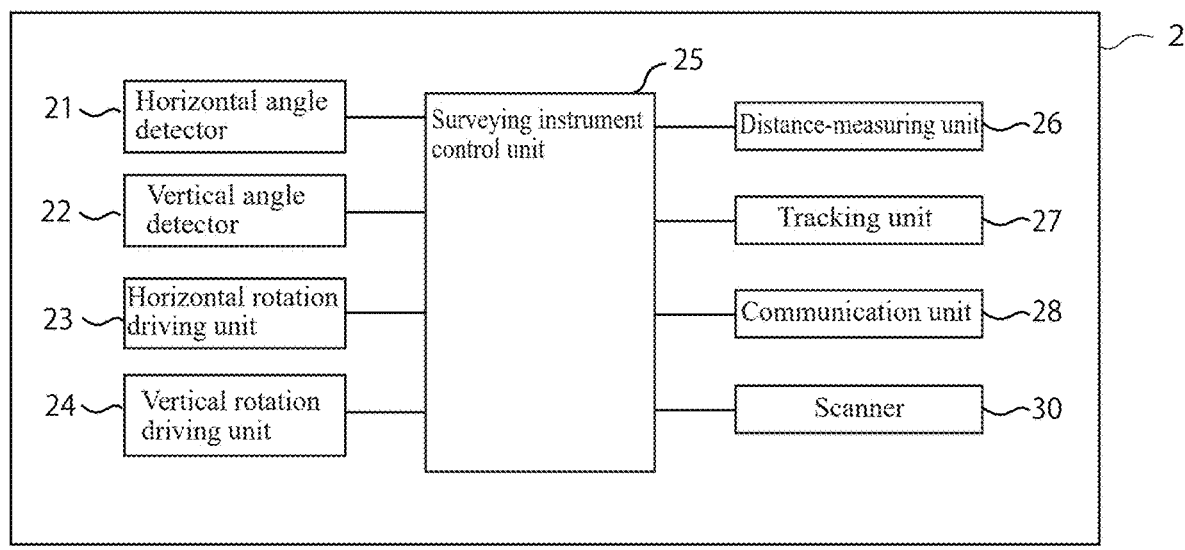
FIG. 2 is a configuration block diagram of a surveying instrument.

FIG. 2 is a configuration block diagram of the surveying instrument 2. The surveying instrument 2 includes a horizontal angle detector 21, a vertical angle detector 22, a horizontal rotation driving unit 23, a vertical rotation driving unit 24, a surveying instrument control unit 25, a distance-measuring unit 26, a tracking unit 27, a communication unit 28, and the scanner 30.

The horizontal angle detector 21 and the vertical angle detector 22 are encoders. The horizontal angle detector 21 is provided on a rotation shaft of the bracket portion 2b, and detects a horizontal angle of the bracket portion 2b. The vertical angle detector 22 is provided on a rotation shaft of the telescope 2c, and detects a vertical angle of the telescope 2c.

The horizontal rotation driving unit 23 and the vertical rotation driving unit 24 are motors. The horizontal rotation driving unit 23 drives the rotation shaft of the bracket portion 2b, and the vertical rotation driving unit 24 drives the rotation shaft of the telescope 2c. By collaboration of both driving units, the orientation of the telescope 2c is changed. The horizontal angle detector 21 and the vertical angle detector 22 constitute an angle-measuring unit. The horizontal rotation driving unit 23 and the vertical rotation driving unit 24 constitute a driving unit.

The distance-measuring unit 26 includes a light transmitting unit and a light receiving unit, and outputs distance-measuring light, for example, an infrared pulsed laser, etc., from the light transmitting unit, receives reflected light of the distance-measuring light by the light receiving unit, and measures a distance from a phase difference between the distance-measuring light and internal reference light. The distance-measuring unit can make not only a prism measurement but also a non-prism measurement.

The tracking unit 27 includes a tracking light transmitting system that outputs, as tracking light, an infrared laser, etc., of a wavelength different from that of the distance-measuring light, and a tracking light receiving system including an image sensor such as a CCD sensor or CMOS sensor. The tracking unit 27 acquires a landscape image including the tracking light and a landscape image excluding the tracking light, and transmits both images to the surveying instrument control unit 25. The surveying instrument control unit 25 obtains a center of a target image from a difference between the images, detects a position where a deviation between a center of the target image and a visual axis center of the telescope 2c falls within a certain value as a position of the target, and performs automatic tracking to cause the telescope 2c to always face the target.

The communication unit 28 enables communication with an external network, and for example, connects to the Internet by using an Internet Protocol (TCP/IP) and transmits and receives information to and from the hammering test device 4 and the processing PC 6. The wireless communication is not limited to this, and known wireless communication can be used.

The scanner 30 is a three-dimensional laser scanner.

Figure 3:
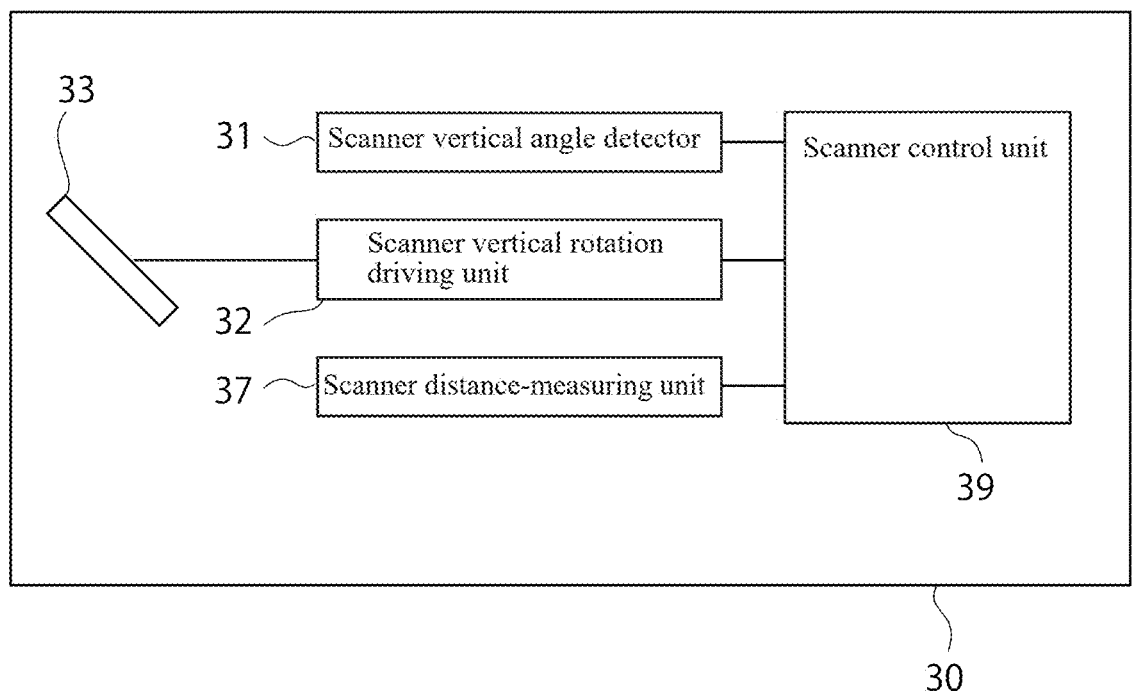
FIG. 3 is a configuration block diagram of a scanner.

FIG. 3 is a configuration block diagram of the scanner. The scanner 30 includes a scanner vertical angle detector 31, a scanner vertical rotation driving unit 32, a turning mirror 33, a scanner distance-measuring unit 37, and a scanner control unit 39.

The turning mirror 33 is driven by the scanner vertical rotation driving unit 32 to turn around a vertical direction turning axis R-R through a lens barrel not illustrated. The turning mirror is disposed on a horizontal rotation axis H-H of the surveying instrument 2 through a housing 30a of the scanner 30, and the housing 30a of the scanner 30 and the bracket portion 2b rotate integrally horizontally.

The scanner distance-measuring unit 37 outputs an infrared pulsed laser light as scanning light toward a measuring object by using the turning mirror 33, and receives reflected light of the infrared pulsed laser light by a light receiving unit such as a photodiode.

The scanner control unit 39 turns the turning mirror 33 by controlling the scanner vertical rotation driving unit 32, and controls the horizontal rotation driving unit 23 to perform horizontal driving, and accordingly performs scanning with scanning light in the vertical direction and the horizontal direction. By measuring a time from emission of the scanning light to reception of the scanning light by the light receiving unit, a distance to a reflection point of the scanning light can be obtained. From the scanner vertical angle detector 31 and the horizontal angle detector 21, reflection point angles are measured. By repeating this process, three-dimensional point cloud data of reflection points is acquired. The acquired point cloud data is transmitted to the processing PC 6 by the communication unit 28. A reference point and a reference direction of the scanner, and a relationship with the telescope 2c, are known.

In the present embodiment, the scanner 30 is disposed at an upper portion of the surveying instrument 2, and for horizontal turning, the bracket portion 2b that rotates horizontally on the base portion 2a is used, however, a configuration including a horizontal rotation driving unit and a horizontal angle detector dedicated to the scanner 30 may be arranged, or a surveying instrument including the scanner 30 integrated with the telescope 2c may be arranged.

The surveying instrument control unit 25 is a microcontroller including a CPU, and includes a ROM (memory/storage) and a RAM (Random-access-memory), and according to programs stored in the ROM, respective controls are executed in the RAM. As controls, information transmission and reception through the communication unit 28, driving of the respective rotation shafts by the horizontal rotation driving unit 23 and the vertical rotation driving unit 24, a distance measurement by the distance-measuring unit 26, angle measurements by the horizontal angle detector 21 and the vertical angle detector 22, automatic tracking by the tracking unit 27, and acquisition of three-dimensional point cloud data by the scanner 30, are performed.

The surveying instrument 2 makes distance and angle measurements of the target T by the distance-measuring unit 26 and the angle-measuring units (21, 22). The surveying instrument 2 makes distance and angle measurements of the target T at a timing synchronized with a timing of conducting a hammering test, and measurement (distance and angle measurements) results (hereinafter, referred to as measurement data DA) are transmitted to the processing PC 6 through the communication unit 28. Even during tracking, the surveying instrument 2 makes distance and angle measurements of the target T at predetermined intervals as needed. Measurement data during tracking is also transmitted to the processing PC 6, and a traveling route and a traveling time of the target T, that is, the hammering test device 4, are grasped.

(Hammering Test Device 4)

Figure 4:
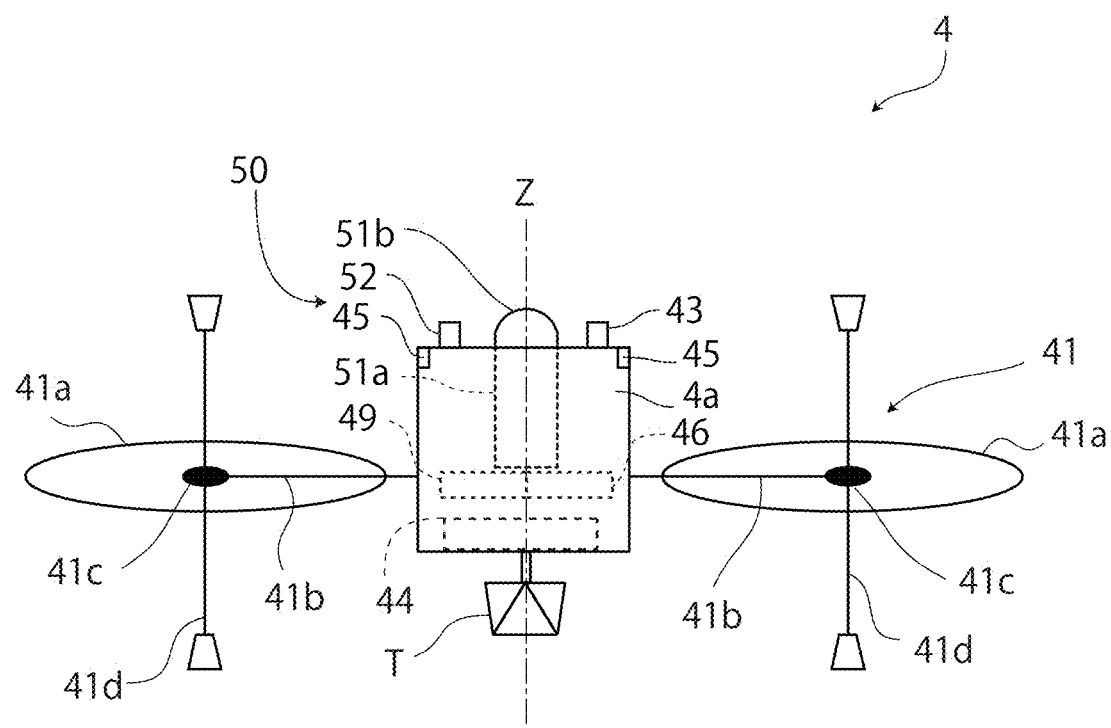
FIGS. 4A and 4B illustrate a hammering test device.
Figure 5:
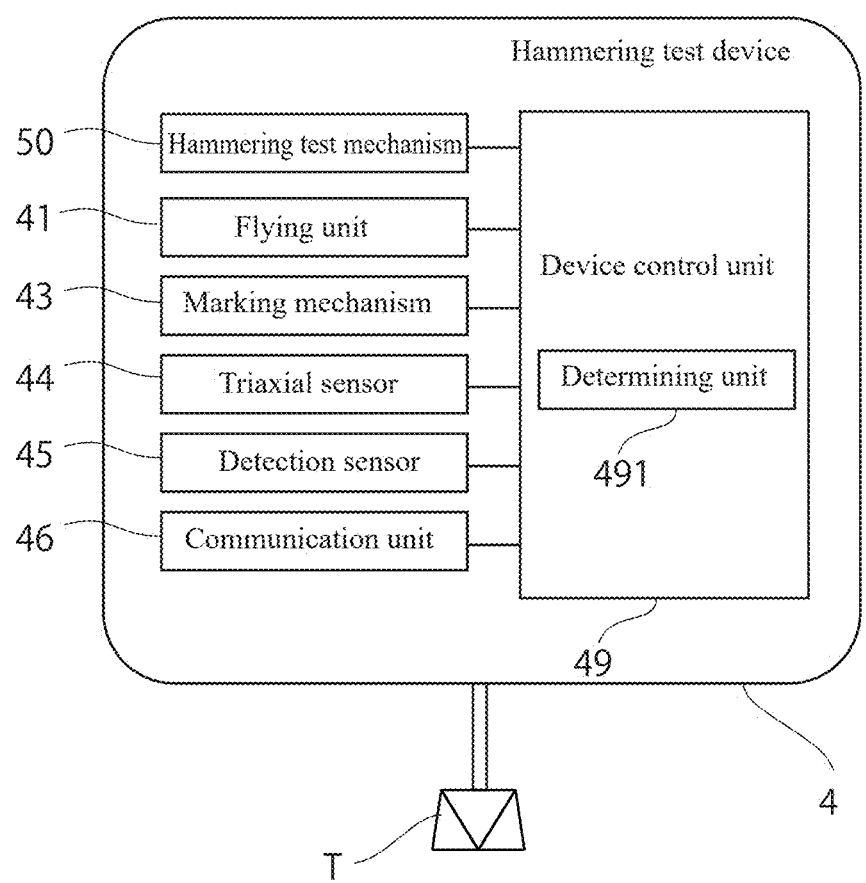
FIG. 5 is a configuration block diagram of the hammering test device.

FIG. 4 illustrates a front view of the hammering test device 4. FIG. 5 is a configuration block diagram of the hammering test device 4.

The hammering test device 4 includes the target T, a hammering test mechanism 50, a flying unit 41, a marking mechanism 43, a triaxial sensor 44, detection sensors 45, a communication unit 46, and a device control unit 49.

The hammering test device 4 has a housing 4a. The target T is fixed to a lower portion of the housing 4a. The target T is a so-called 360-degree prism configured by radially combining a plurality of triangular pyramid-shaped prisms, and retro-reflects light incident from the entire circumference (360 degree) toward a direction opposite to an incident direction of the light.

The hammering test mechanism 50 is provided on an upper portion of the housing 4a, and includes a hammering unit 51 and a sound pickup unit 52.

The hammering unit 51 has a solenoid coil 51a and a columnar hammer 51b, and hammers a to-be-tested surface A by moving the hammer 51b up and down according to ON/OFF of current application to the solenoid coil. In the present embodiment, a hammering point of the hammer 51b is defined as a test point P. Specifically, an intersection between a vertical line of a center of the hammer 51b and a virtual horizontal ceiling surface when the hammering test device 4 is landed in a horizontal state on the virtual horizontal ceiling surface, is defined as a hammering point of the hammer 51b.

The sound pickup unit 52 is a so-called microphone, and is disposed near the hammer 51b and picks up hammering sounds produced by the hammer 51b. Picked-up sound pickup data DC is output to the device control unit 49.

The target T is disposed vertically below the hammer 51b, and is attached so that an optical center (optical reflection point) of the target T passes on a vertical axis Z that is a central axis of the hammer 51b. Relative positions of the optical center point of the target T and the hammering point of the hammer 51b are known.

The flying unit 41 is configured by propellers 41a, propeller frames 41b, propeller motors 41c, and landing rods 41d which are the same in number, and the numbers of which are even numbers of 4 or more. The propeller frames 41b extend radially from the housing 4a, and the propeller motor 41c is attached to a tip end of each propeller frame 41b. To an output shaft of the propeller motor 41c, the propeller 41a is attached. The hammering test device 4 is configured to fly by rotating the propellers 41a by the propeller motors 41c. The landing rods 41d are legs that support the hammering test device 4 when the hammering test device 4 lands on the ground or lands on a test object B, and are vertically provided to extend upward and downward from tip ends of the propeller frames 41b. Each landing rod 41d is adjusted so that when the hammering test device 4 lands on a horizontal surface, the hammering test device 4 takes a horizontal posture. The flying unit 41 functions as a flying device and a posture control device of the hammering test device 4.

The marking mechanism 43 is a discharge device that jets out a colored solution for marking from a nozzle at a tip end to make a marking at a target point. The marking mechanism 43 is fixed to an upper portion of the housing 4a so that when the hammering test device 4 lands on a horizontal surface, a solution jetting direction is directed vertically upward. As a result of a hammering test, when it is determined that there is an abnormality, the marking mechanism 43 jets out the solution to visualize an abnormal portion. When a fluorescent paint is contained in the solution, a worker can easily grasp a position even in a dark place such as a tunnel and at night.

The triaxial sensor 44 is an IMU (inertial measuring unit), and includes a triaxial gyro and a triaxial accelerometer, and acquires angular velocities and accelerations of the hammering test device 4 in three-axis directions (roll, pitch, yaw). The triaxial sensor 44 functions as a posture detecting device that detects a posture of the hammering test device 4. Hereinafter, a detection result of the triaxial sensor 44 is referred to as posture data DB. Posture data DB acquired by the triaxial sensor 44 at a timing synchronized with a timing of conducting a hammering test is transmitted to the processing PC 6. The hammering test device 4 is an air vehicle, and can take a posture tilted in three-axis directions. Therefore, for grasping a detailed position of the test point P of the hammering test, use of posture data DB at the time of the hammering test is preferable. Together with the measurement data DA that is distance and angle measurement data of the target T, the posture data DB transmitted to the processing PC 6 is used for calculation of detailed three-dimensional coordinates of the test point P where the hammering test was actually conducted. Here, the test point P is a set position set to be subjected to a hammering test in a flight plan, and a test point PP is a hammering point actually hammered in a hammering test.

The detection sensors 45 are optical sensors that detect an obstacle, and are disposed in four corners on the housing 4a and detect an obstacle around the hammering test device 4. When an obstacle is detected, the hammering test device 4 avoids this obstacle. A configuration may be arranged in which an imaging device such as a CCD or CMOS sensor is used to identify whether there is an obstacle and a position of an obstacle by analyzing imaged images.

The communication unit 46 has a structure equivalent to the structure of the above-described communication unit 28, and transmits and receives information to and from the surveying instrument 2 and the processing PC 6. When the hammering test device 4 is manually controlled, the communication unit 46 receives a control signal from the processing PC 6 and inputs the control signal into the device control unit 49. When the device is automatically controlled, the communication unit 46 receives a flight plan, and inputs it into a memory (ROM) of the device control unit 49.

The device control unit 49 is a microcontroller including a CPU, and includes a ROM and a RAM, and according to programs stored in the ROM, respective controls are executed in the RAM. As programs, a flight program, etc., for computing a control signal related to a flight and commanding the flying unit 41 (specifically, the propeller motors 41c) to drive in a required state, etc., are stored. In the case of automatic control, computing is performed based on an input flight plan, and in the case of manual control, computing is performed based on a control signal received from the device communication unit 47, and a detection result of the IMU 51. The device control unit 49 performs controls of various mechanisms installed in the hammering test device 4, including controls of a timing of a hammering test by the hammering test mechanism 50, a jetting instruction to the marking mechanism 43, and data acquisition by the triaxial sensor 44 and the detection sensors 45, etc.

In the device control unit 49, a determining unit 491 that determines whether there is an abnormality by analyzing sound pickup data DC output from the hammering test mechanism 50 is installed. Here, an abnormality includes cracking, peeling, floating, and internal cavities, etc., of a to-be-tested surface. When an abnormality is found or there is a possibility of an abnormality, the device control unit 49 causes the marking mechanism 43 to jet out the solution.

The hammering test device 4 automatically moves to test points P (P1, P2, P3 . . . ) in order according to a flight plan, and conducts a hammering test at each test point. A flight of the hammering test device 4 to a test point Pn, landing on a test object B for conducting a hammering test on the test point P, posture control after landing, and a hammering test, are automatically performed. Switching between a manual fight and an automatic flight during flying is possible, and a worker may switch an automatic flight to a manual flight and control the device by himself/herself, and may further switch the flight to an automatic flight again.

When automatic control is started, the hammering test device 4 automatically takes off and flies to a first test point P, and when it arrives, matches a position of a hammering point of the hammer 51b with the test point P, and lands according to a shape of the test object B and maintains a posture. When a hammering test is conducted and the determining unit 491 determines that the test object B has an abnormality, the marking mechanism 43 jets the solution to mark a marking. Upon completion of the hammering test at a test point, the hammering test device 4 automatically leaves from there and then flies to a next test point. This process is repeated until all test points are tested. Accordingly, the hammering test device 4 can conduct the hammering test on all desired test points P.

Figure 6A:
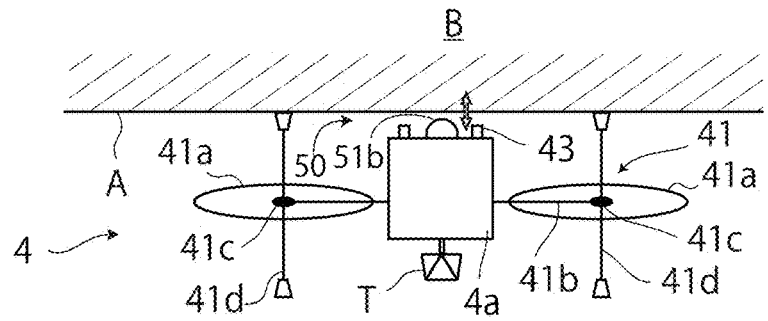
FIGS. 6A, 6B, and 6C illustrate landing states of the hammering test device.
Figure 6B:
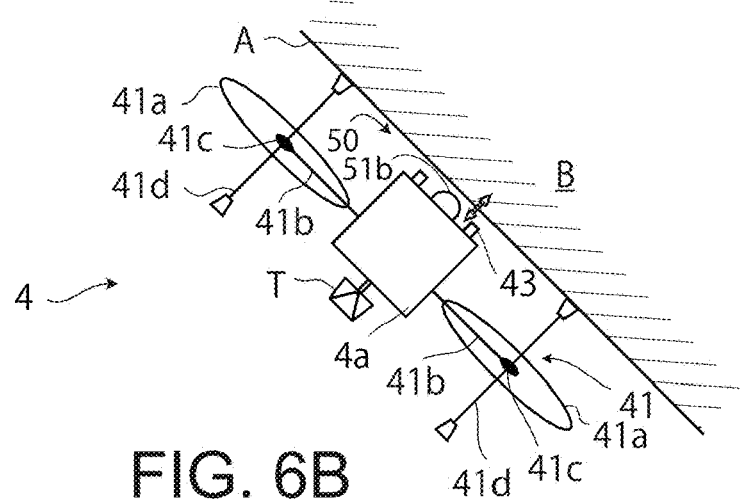
Figure 6C:
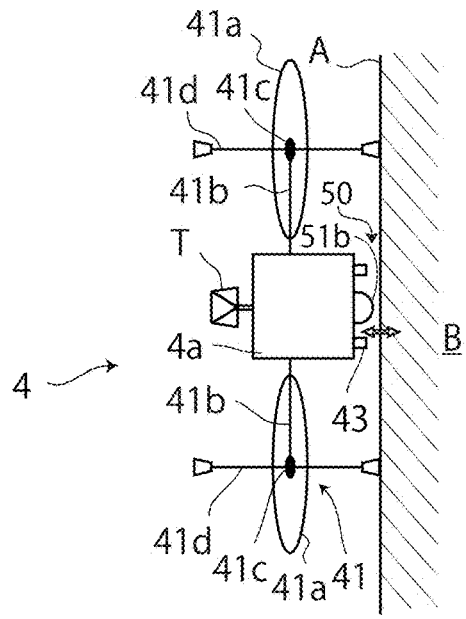

FIGS. 6A, 6B, and 6C illustrate postures of the hammering test device 4 when conducting a test. The hammering test device 4 is configured to be capable of landing on a surface (hereinafter, referred to as a to-be-tested surface A) of the test object B by the landing rods 41d extending upward and downward from the housing 4a.

As legs of the hammering test device 4, the landing rods 41d extend upward and downward from end portions of the propeller frames 41b, and a landing rod extending upward is provided for landing on a to-be-tested surface, and a landing rod extending downward is provided for landing on the ground. To conduct a hammering test on the test object B, first, the hammering test device 4 is subjected to posture control by causing the hammering test mechanism 50 to face the to-be-tested surface A on which a hammering test is conducted. In this way, the hammering test device 4 is caused to approach the to-be-tested surface A.

When the propellers 41a rotate, an air pressure above the propellers 41a decreases to be lower than an air pressure below the propellers, and a lift force is generated. When the device approaches the to-be-tested surface A, due to the air pressure difference, the hammering test device 4 is attracted to the to-be-tested surface A. The attracted hammering test device 4 lands on the to-be-tested surface A by the landing rods 41d. Due to the air pressure difference described above, the hammering test device 4 is attracted and stuck onto the to-be-tested surface A, and the posture of the hammering test device 4 is stabilized.

During a flight, the hammer 51b of the hammering test mechanism 50 is lowered toward the housing 4a, and is disposed lower than upper end portions of the landing rods 41d, and even when the landing rods 41d come into contact with the to-be-tested surface A, the hammering test mechanism 50 does not interfere with the to-be-tested surface A. At the time of a hammering test, the hammer 51b projects toward the to-be-tested surface A and hammers the to-be-tested surface A.

As illustrated in FIG. 6A, when the to-be-tested surface A is a ceiling surface, for example, an upper portion of a tunnel or a lower surface of a bridge floor plate (hereinafter, referred to as a ceiling surface), the hammering test device flies to a lower side of the to-be-tested surface A, and ascends from there and comes into contact with and is stuck onto the to-be-tested surface A by the landing rods 41d. As illustrated in FIG. 6B, even when the to-be-tested surface A is an inclined surface, or as illustrated in FIG. 6C, even when the to-be-tested surface A is a vertical surface, the hammering test device 4 can come into contact with and is stuck onto the to-be-tested surface A, and can stably conduct a hammering test.

(Processing PC 6)

Figure 7:
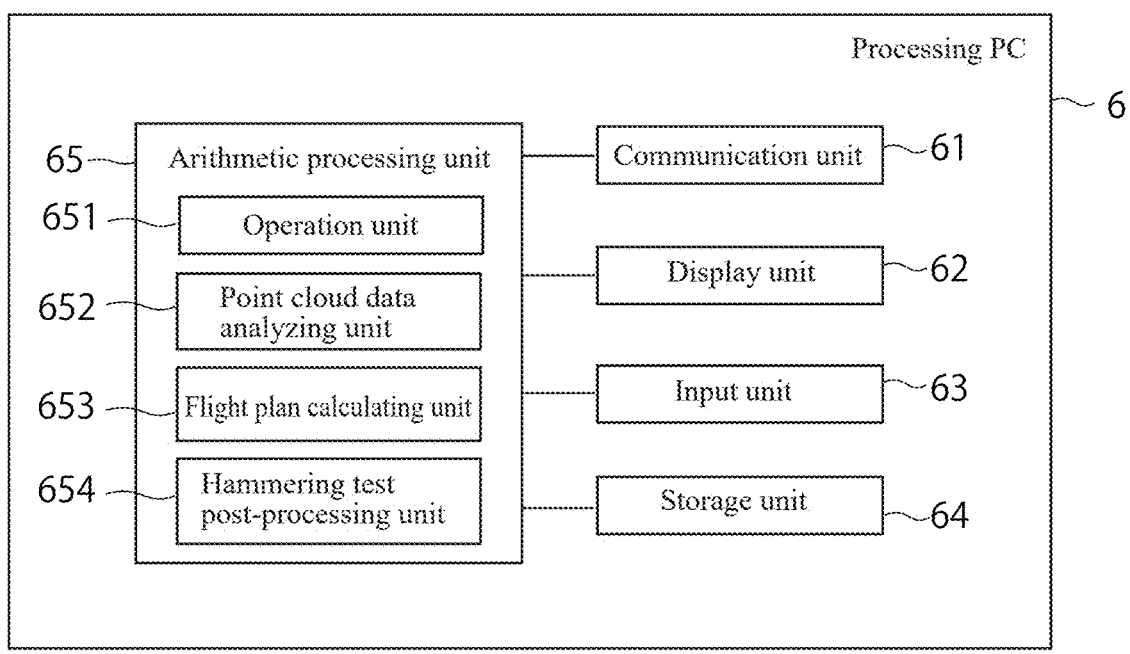
FIG. 7 is a configuration block diagram of a processing PC.

FIG. 7 is a configuration block diagram of the processing PC 6. The processing PC 6 is a general-purpose personal computer, dedicated hardware using a PLD (programmable Logic Device), etc., a tablet terminal, a smartphone, etc. The processing PC 6 includes a communication unit 61, a display unit 62, an input unit 63, a storage unit 64, and an arithmetic processing unit 65.

The communication unit 61 has a structure equivalent to the structure of the above-described communication unit 28, and transmits and receives information to and from the surveying instrument 2 and the hammering test device 4.

The display unit 62 is, for example, a liquid crystal display. The input unit 63 is a keyboard, a mouse, etc., and enables various inputs, selections, and determinations.

The storage unit 64 is, for example, an HDD drive. In the storage unit 64, data acquired by the hammering test system 1 is stored.

The arithmetic processing unit 65 is a control unit configured by mounting at least a CPU and a memory (RAM, ROM, etc.) on an integrated circuit. Based on various programs stored in the ROM, arithmetic processing is performed in the RAM. In the arithmetic processing unit 65, an operation unit 651, a point cloud data analyzing unit 652, a flight plan calculating unit 653, and a hammering test post-processing unit 654 are configured by programs.

The operation unit 651 is a control program of the hammering test device 4. The hammering test device 4 is configured to be capable of performing an automatic flight and a manual flight. In a manual flight, the operation unit 651 collaborates with the input unit 63 and a worker directly operates (manually flies) the hammering test device 4. In an automatic flight, the operation unit 651 grasps position information by automatic tracking of the surveying instrument 2, and causes the hammering test device 4 to fly along a desired route based on an input flight plan while performing a feedback control. In an automatic flight, a worker does not have to perform an operation, and the hammering test device 4 is automatically driven under complete control of the operation unit 651. Switching between a manual flight and an automatic flight can be made depending on the situation. In this case, as the input unit 63, a separate dedicated controller may be prepared.

The point cloud data analyzing unit 652 calculates a three-dimensional shape of a scanning object based on three-dimensional point cloud data acquired by the scanner 30. As a calculation method, a known method may be applied, and detailed description thereof is omitted.

The flight plan calculating unit 653 calculates a flight plan of the hammering test device 4 based on three-dimensional shape data of a test object calculated by the point cloud data analyzing unit 652 or CAD data of the test object prepared in advance. Based on a test range of one hammering test around a hammering point, test points P are set so that no region is left untested.

The hammering test post-processing unit 654 performs post-processing of data acquired through hammering tests. Post-processing will be described in detail later.

Figure 8:
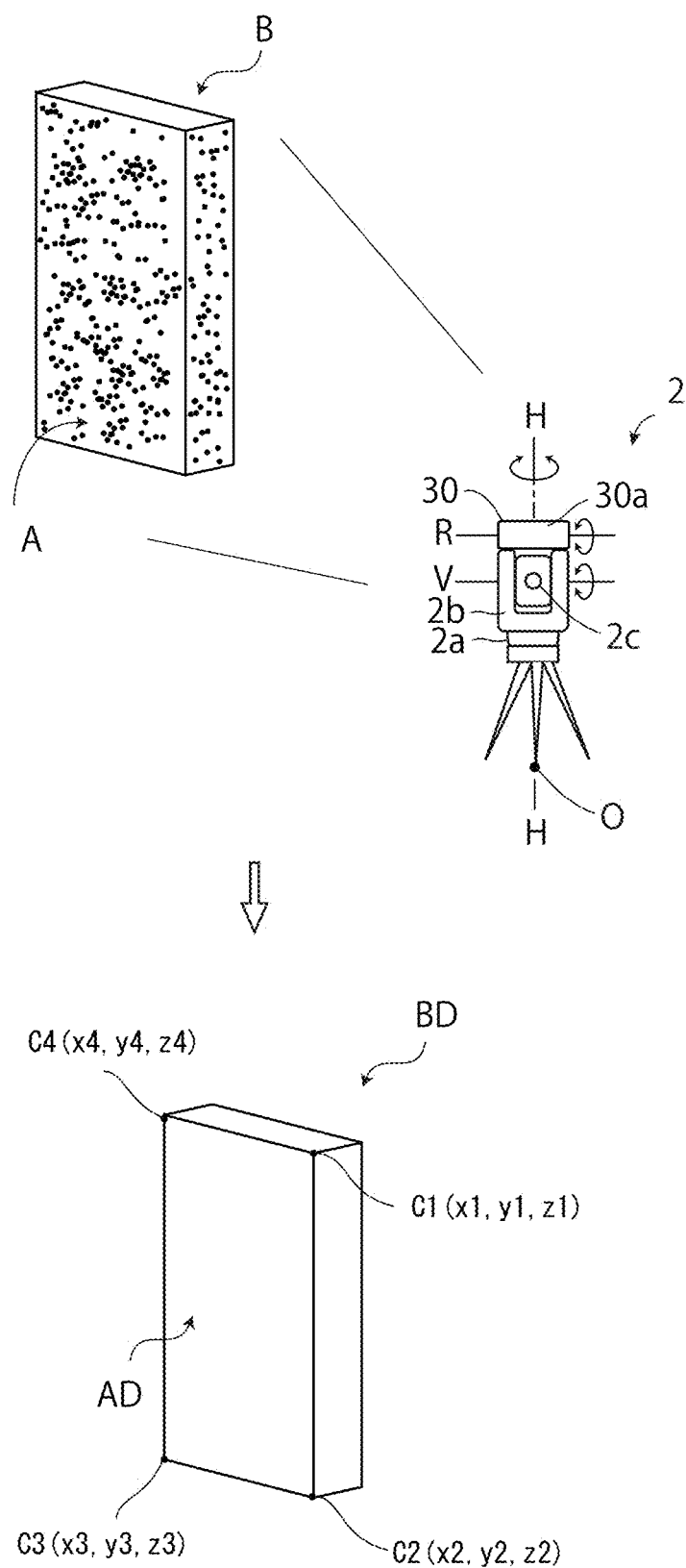
FIG. 8 illustrates an example of calculation of three-dimensional shape data.

FIG. 8 illustrates an example of calculation of three-dimensional shape data by the scanner 30 and the point cloud data analyzing unit 652.

As illustrated in FIG. 8, first, the surveying instrument 2 is installed at a known reference point O, and three-dimensional point cloud data is acquired by scanning the test object B with scanning light of the scanner 30.

By coordinate conversion from coordinates (x0, y0, z0) of the reference point O, coordinates of each point are calculated. Accordingly, not only a shape itself of a calculated test object BD, but also a shape on absolute three-dimensional coordinate axes, are grasped. For example, four corner portions of a to-be-tested surface AD that is rectangular in a data shape are respectively grasped as coordinates C1 (x1, y1, z1), coordinates C2 (x2, y2, z2), coordinates C3 (x3, y3, z3), and coordinates C4 (x4, y4, z4).

When the shape of the test object B cannot be completely grasped by one three-dimensional scanning, the surveying instrument 2 is disposed at a plurality of reference points O2, O3, O4 . . . and caused to perform scanning. Alternatively, a plurality of surveying instruments 2 may be used.

Figure 9:
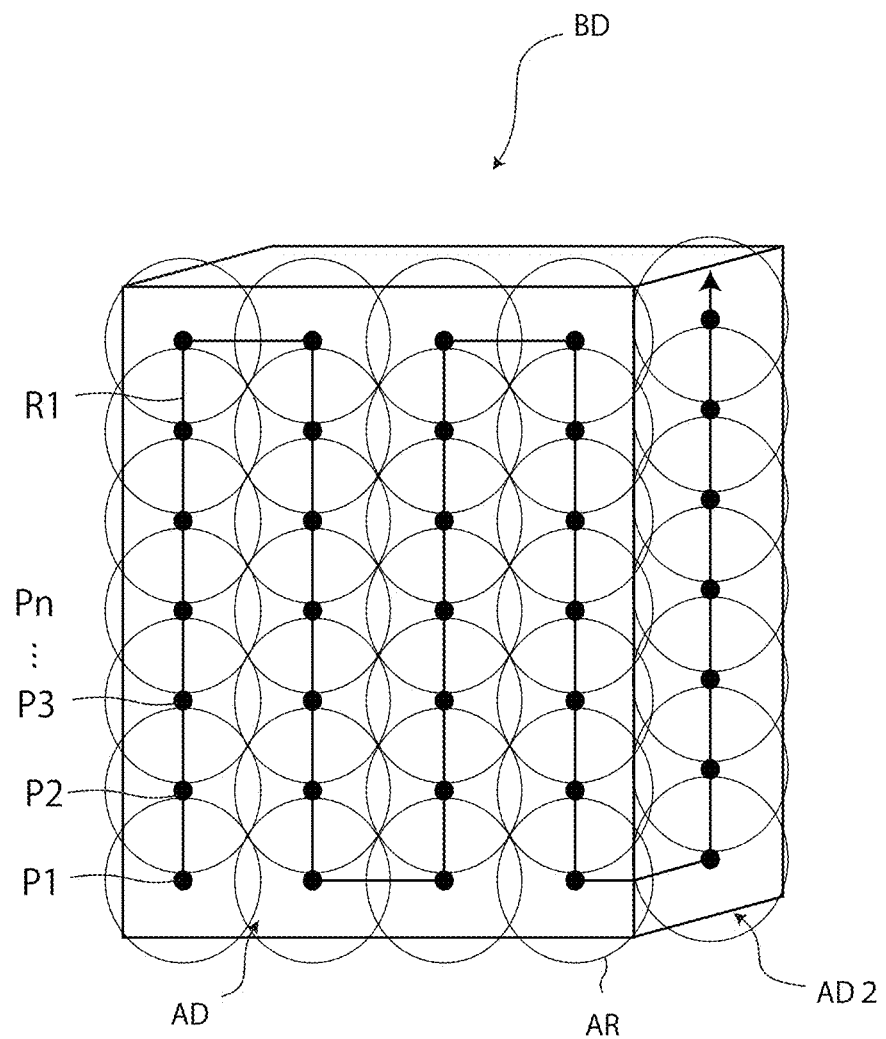
FIG. 9 illustrates an example of calculation of a flight plan.

FIG. 9 illustrates an example of a flight plan in the flight plan calculating unit 653. The flight plan calculating unit 653 calculates a flight plan from the calculated test object BD. To test to-be-tested surfaces AD and AD2 as test regions of the test object B without omission, test points P (P1, P2, P3 . . . ) are set at intervals of a predetermined distance, and a flight route R1 connecting all of these test points is calculated. The flight route R1 and the test points P are also grasped in the form of coordinates such as the test point P1 (xp1, yp1, zp1), the test point P2 (xp2, yp2, zp2) . . . . A flight plan calculated so as to include these is transmitted to the hammering test device 4 and the surveying instrument 2.

In a range in which the shape of the test object B cannot be completely grasped by one three-dimensional scanning, the surveying instrument 2 may not be able to track the target T. When scanning is performed a plurality of times, instead of testing the entire test object B by just one flight, it is preferred to calculate a flight plan by a plurality of flights in which the test region of the test object B is covered. Accordingly, the entire region can be accurately tested. It is also possible that installation of the surveying instrument 2, scanning, calculation of a flight plan, and hammering tests are defined as one set, and are performed for each installation position of the surveying instrument 2 so that the entire test object B is tested thoroughly.

(Hammering Test Method)

Figure 10:
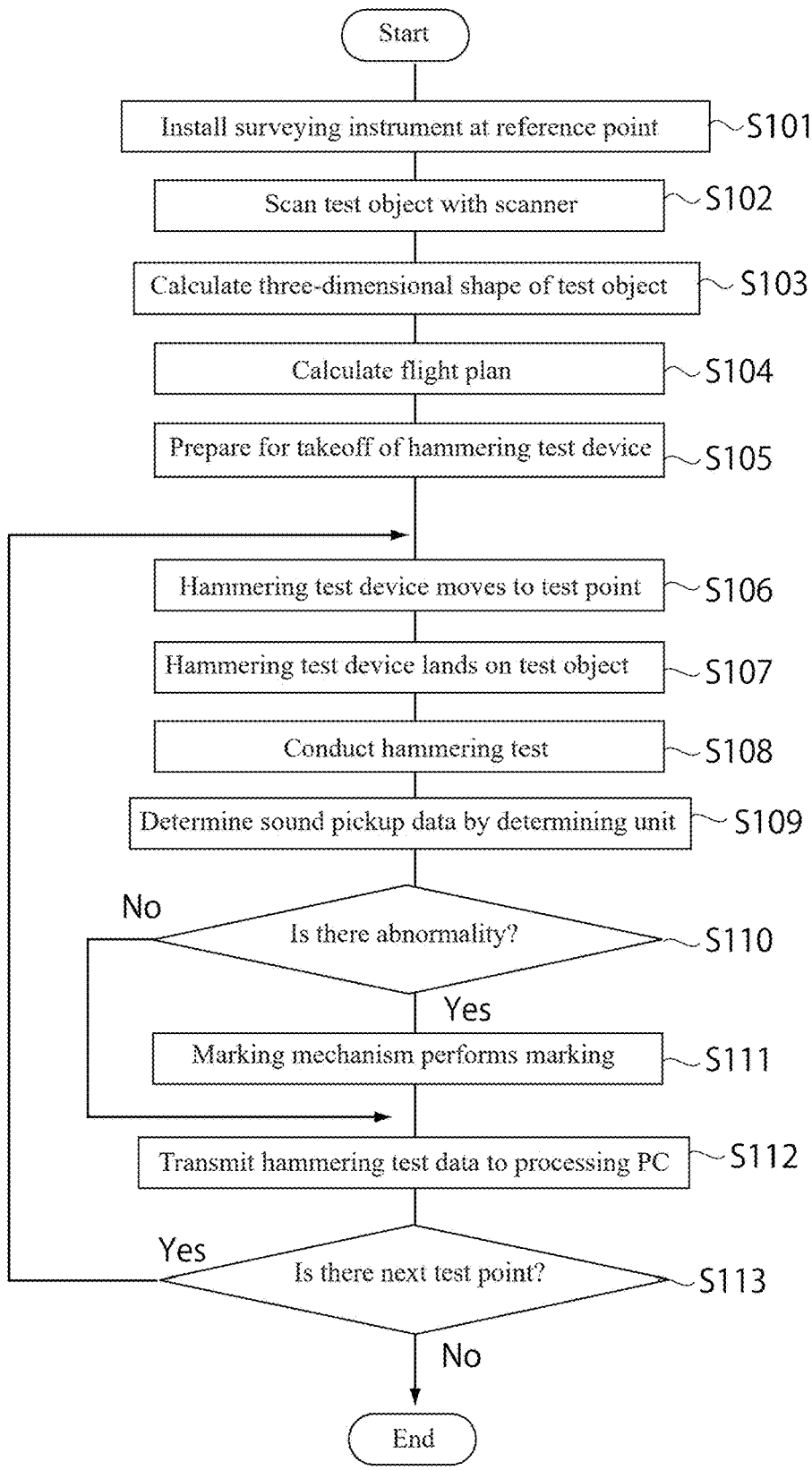
FIG. 10 is a flowchart of a hammering test.

Next, a hammering test method using the hammering test system 1 will be described. FIG. 10 illustrates a work process flow using the hammering test system 1. In the hammering test system 1, a plurality of test points P (P1, P2, P3 . . . ) on the test object B can be successively subjected to a hammering test.

First, in Step S101, the surveying instrument 2 is installed at a reference point. The reference point is a known point.

Next, the processing shifts to Step S102, and scanning of the test object B is performed. Three-dimensional point cloud data is acquired by scanning the test object B with scanning light by the scanner 30 of the surveying instrument 2.

Next, the processing shifts to Step S103, and a three-dimensional shape of the test object B is calculated. Based on the three-dimensional point cloud data acquired by scanning with the scanner 30, the point cloud data analyzing unit 652 calculates three-dimensional shape data of the test object B. The three-dimensional shape data is also grasped as absolute three-dimensional coordinates from the reference point that is a known point where the surveying instrument 2 is installed.

Next, the processing shifts to Step S104, and a flight plan of the hammering test device 4 is calculated. Based on the acquired three-dimensional shape data, test points P (P1, P2, P3 . . . ) are set so that the test object is tested without omission, and a flight route connecting these test points is calculated.

Next, the processing shifts to Step S105, and a preparation for takeoff of the hammering test device 4 is made. The flight plan is transmitted from the processing Computer (PC) 6 to the hammering test device 4 and the surveying instrument 2. The surveying instrument 2 makes distance and angle measurements to grasp an initial position of the hammering test device 4. The surveying instrument 2 locks on to the target T of the hammering test device 4 and starts tracking.

Next, the processing shifts to Step S106, and the hammering test device 4 flies to the test point Pn. A posture and a position of the hammering test device 4 are grasped and controlled by the triaxial sensor 44 and tracking by the surveying instrument 2 as needed. The hammering test device 4 also avoids an obstacle by the detection sensors 45 and flies to the test point Pn.

Next, the processing shifts to Step S107, and the hammering test device 4 lands on the test object B. When the hammering test device 4 arrives at a position near the test point Pn, the hammering test device 4 approaches the to-be-tested surface A while being controlled in posture so as to cause the hammering test mechanism 50 to face the to-be-tested surface A on which the test point Pn is present. When the hammering test device 4 approaches the to-be-tested surface A, the hammering test device 4 is attracted to the to-be-tested surface A, and lands on the to-be-tested surface A by the landing rods 41d and is stabilized in posture.

Next, the processing shifts to Step S108, and a hammering test is conducted. The device control unit 49 applies electric current to the solenoid coil 51a of the hammering test mechanism 50, and hammers the to-be-tested surface A by moving the hammer 51b up and down. A hammering sound is picked up by the sound pickup unit 52, and acquired sound pickup data DC is output to the device control unit 49. The hammering test device 4 acquires posture data DB by the triaxial sensor 44 at a timing synchronized with a timing of a hammering sound produced by the hammer. In addition, in synchronization with a timing of the hammering test of the hammering test device 4, distance and angle measurements of the target T are made by the surveying instrument 2, and acquired measurement data DA is transmitted to the processing PC 6 through the communication unit 28.

Next, the processing shifts to Step S109, and by the determining unit 491, whether there is an abnormality near the test point Pn (hammering test range) on the to-be-tested surface A is determined from an analysis of the sound pickup data DC.

Next, the processing shifts to Step S110, and when the determining unit 491 determines that there is an abnormality, the processing shifts to Step S111, and the marking mechanism 43 jets out the solution toward the to-be-tested surface A and performs marking. When jetting is completed, the processing shifts to Step S112. When the determining unit 491 determines that there is no abnormality in Step S110, the processing shifts to Step S112.

Next, the processing shifts to Step S112, and as hammering test data, the posture data DB and the sound pickup data DC are transmitted to the processing PC 6. In the processing PC 6, the measurement data DA, the posture data DB, and the sound pickup data DC are linked to each other as hammering test results at the test point Pn and stored in the storage unit 64. The hammering test at the test point Pn is completed.

Next, the processing shifts to Step S113, and when there is a test point Pn to be subjected to a next hammering test, the processing shifts to Step S106, and until hammering tests at all test points P are completed, Steps S106 to S113 are repeated. When hammering tests at all test points P are completed, the processing is completed.

Operation and Effects

As described above, according to the hammering test system 1, a three-dimensional shape of the test object B is grasped, and the hammering test device 4 automatically conducts hammering tests on test points in order according to a flight plan. The to-be-tested surface A can be tested without a problem even when the to-be-tested surface A is a vertical surface or a ceiling surface, and a hammering test can be conducted at a desired position. A shape and coordinates of the test object B have been grasped by scanning with the scanner 30. Therefore, a flight plan of the hammering test device 4 can be calculated. Accordingly, the test can be safely and efficiently conducted. Even in high places that are out of the inspector's reach, the hammering test device 4 can move to a test point by itself and conduct a hammering test without a problem. In the case of high places, securing a foothold and safety of an inspector become a problem, however, a hammering test can be safely conducted without the need for securing a foothold. In addition, a test by an air vehicle requires a lot of skill, however, by preparing an automatic flight plan by grasping a shape in advance, hammering tests are automatically conducted without a worker's operation.

In a hammering test, a determination is made based on a hammering sound produced by hammering with a hammer, and the hammering test depends on the experience and sense of an inspector, however, hammering can be repeatedly mechanically performed with the same force, and an abnormality can be detected from an analysis made by the determining unit without depending on experience. Therefore, quantitative tests without variation can be conducted. A marking is marked at a portion determined to be abnormal, and the abnormal portion can be grasped at a glance. By an automatic flight, the to-be-tested surface A is automatically tested thoroughly. A test position is accurately grasped as absolute coordinates by a measurement made by the surveying instrument 2. Therefore, the test is conducted without omission, and a region suspected of being abnormal can be tested intensively.

By the hammering test device 4 that is an air vehicle, a hammering test can be conducted even in high places that are out of a worker's reach or a location where scaffolding cannot be built.

The surveying instrument 2 makes distance and angle measurements as needed while performing tracking. Accordingly, a flight route and test points can be accurately grasped as absolute coordinates. Flight routes can cross each other, and there is no problem even when hammering tests are conducted several times in the same place. In a flight plan, a test radius of the hammering test can be set according to conditions of a test object (material such as concrete, the number of years elapsed after construction, and a surface condition, etc.). A configuration may be arranged in which, when an abnormality is detected in a hammering test, a hammering test is conducted around the abnormal portion again as an additional mission. When a construction joint, etc., where an abnormality easily occurs is detected in three-dimensional shape data, settings may be made so that test ranges around the construction joint are narrowed to increase the hammering test density, or a hammering test is repeatedly conducted.

It is difficult to control a posture of the air vehicle, however, by distance and angle measurements of the target T of the hammering test device 4, a hammering point is accurately grasped as three-dimensional coordinates. Therefore, even when there is a slight deviation between coordinates of a test point P as an initial target and an actual hammering point, whether there is no problem with the deviation can be determined, and when it is determined that there is no problem with the deviation, transition to a next test point can be made. Preferably, in this case, based on coordinates of a hammering point on which a hammering test was actually conducted, the following flight plan is corrected.

According to the configuration described above, a shape of a test object whose shape and coordinates are not known is grasped, and a hammering test is automatically conducted on the entire region thoroughly. Advance preparation including preparation of three-dimensional data of the test object and settings of test points is not required, and the hammering test can be automatically conducted thoroughly even on an old building whose three-dimensional data is not given.

(Post-Processing of Hammering Test Data)

Next, post-processing of data acquired through hammering tests will be described in detail.

In the storage unit 64, measurement data DA (DA1, DA2, DA3 . . . ), posture data DB (DB1, DB2, DB3 . . . ), and sound pickup data DC (DC1, DC2, DC3 . . . ) at the test points PP (PP1, PP2, PP3 . . . ) subjected to actual hammering tests, are stored.

The hammering test post-processing unit 654 calculates three-dimensional coordinates DP of the test points PP from three-dimensional coordinates (absolute three-dimensional coordinates), the measurement data DA acquired by the surveying instrument 2, and the posture data DB of the hammering test device 4. Based on the calculated three-dimensional coordinates DP (DP1, DP2, DP3 . . . ), these (test results) are displayed according to the test object BD that is three-dimensional shape data of the test object B.

Further, by analyzing the sound pickup data DC in detail, abnormality levels are calculated, and are also displayed according to the test object BD. Accordingly, test results are visualized. It is preferable that the test results are colored according to the levels and displayed on the display unit 62 so as to indicate states of abnormal portions in a recognizable manner.

Figure 11A:
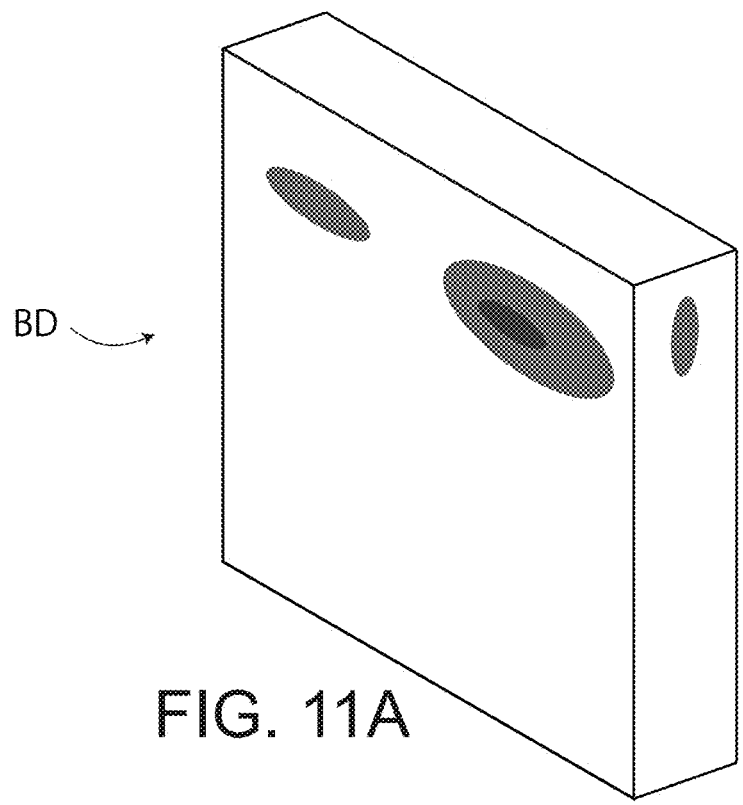
FIG. 11A illustrates an example of display after post-processing of a hammering test.
Figure 11B:
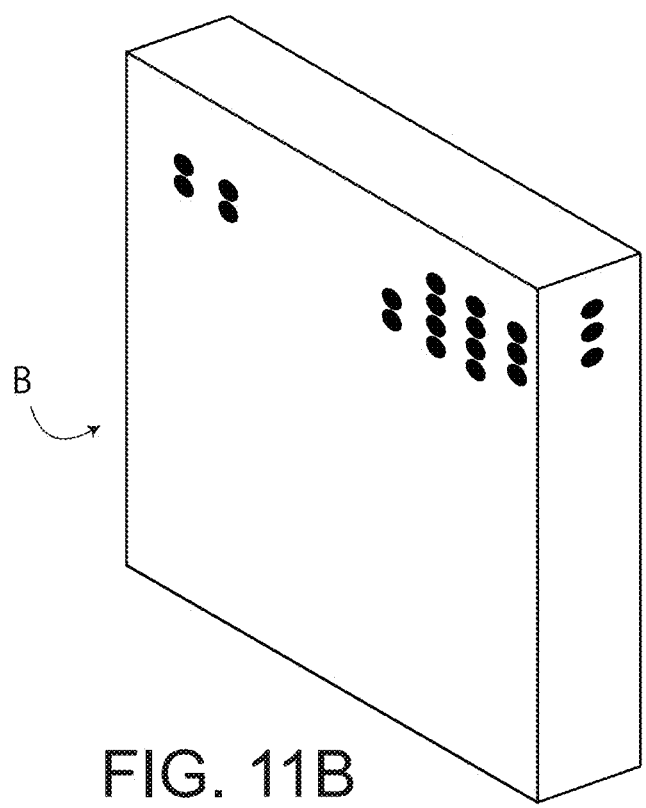
FIG. 11B illustrates a test object after hammering tests.

FIG. 11A illustrates an example of the test object BD as data subjected to the post-processing described above by the hammering test post-processing unit 654 and displayed on the display unit 62. FIG. 11B illustrates a test object B after hammering tests.

As illustrated in FIG. 11A, the test object BD is displayed on the display unit 62, and portions suspected of being abnormal are illustrated as regions according to abnormality levels. As illustrated in FIG. 11B, on the actual test object B, markings are marked. A worker can visually grasp the abnormal portions of the test object B both from data and the actual object.

Figure 12:
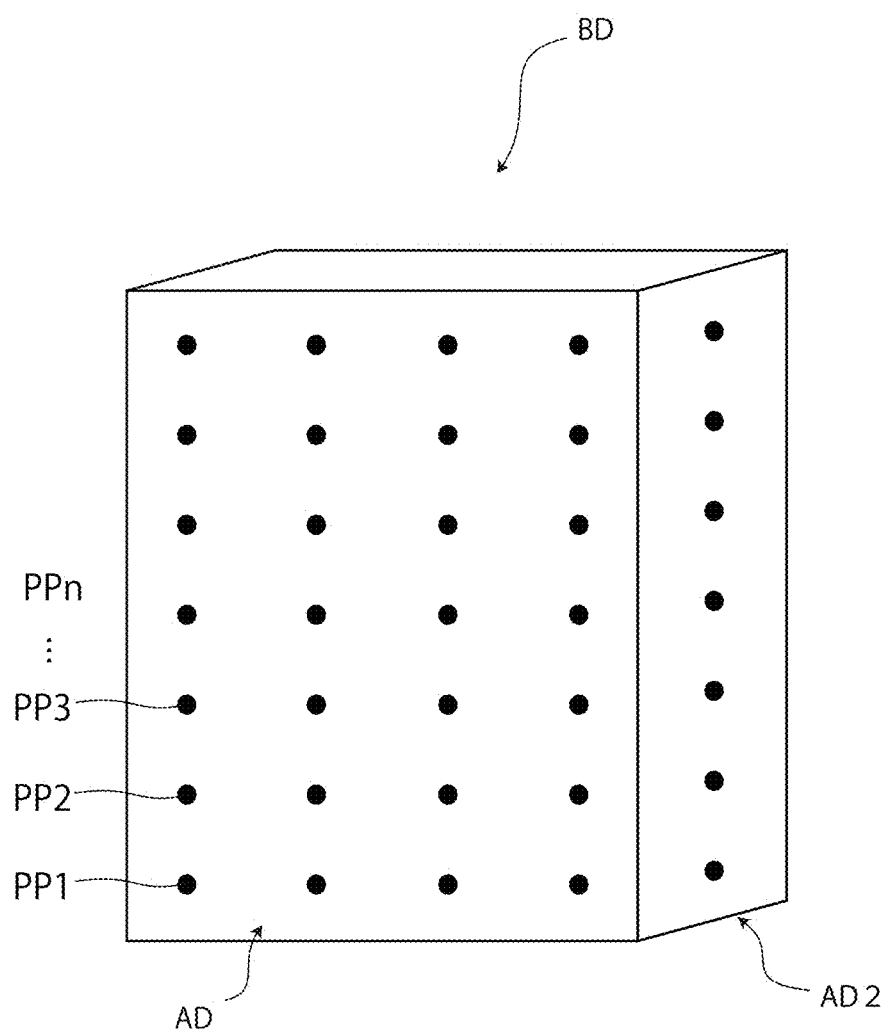
FIG. 12 illustrates an example of a hammering test result.

FIG. 12 illustrates another example of data to be displayed on the display unit 62. On the test object BD, data on hammering points as test points are displayed as points PP. The points PP (PP1, PP2, PP3 . . . ) are arranged so as to correspond to hammering point coordinates where a hammering test was actually conducted. By displaying the data subjected to post-processing in this way, the test object BD and the tested hammering points are visualized.

When a point PP is clicked, the sound pickup data DC can be listened to, and as determination details and analysis results, items are displayed such as an abnormality type (cracking, floating, etc.) and an estimated shape of a predetermined range around the test point, etc. Each point PP is filled with a color that differs depending on whether there is an abnormality or depending on an abnormality level, and an abnormal state is also grasped at a glance.

In many cases, a test object is required to be tested annually for safety, and the shape data and the flight plan of the test object B can be used in common for the next year's test, and the number of processes of the annual test can be reduced. Abnormal portions can also be grasped, so that by conducting a hammering test thoroughly on the test object B after an elapse of a predetermined period of time, a change due to aging of the test object B can be grasped. Without depending on the skill level of an inspector, and even with a time gap, the test can be conducted under the same conditions. Therefore, a state of the test object B can be objectively grasped.

Figure 13:
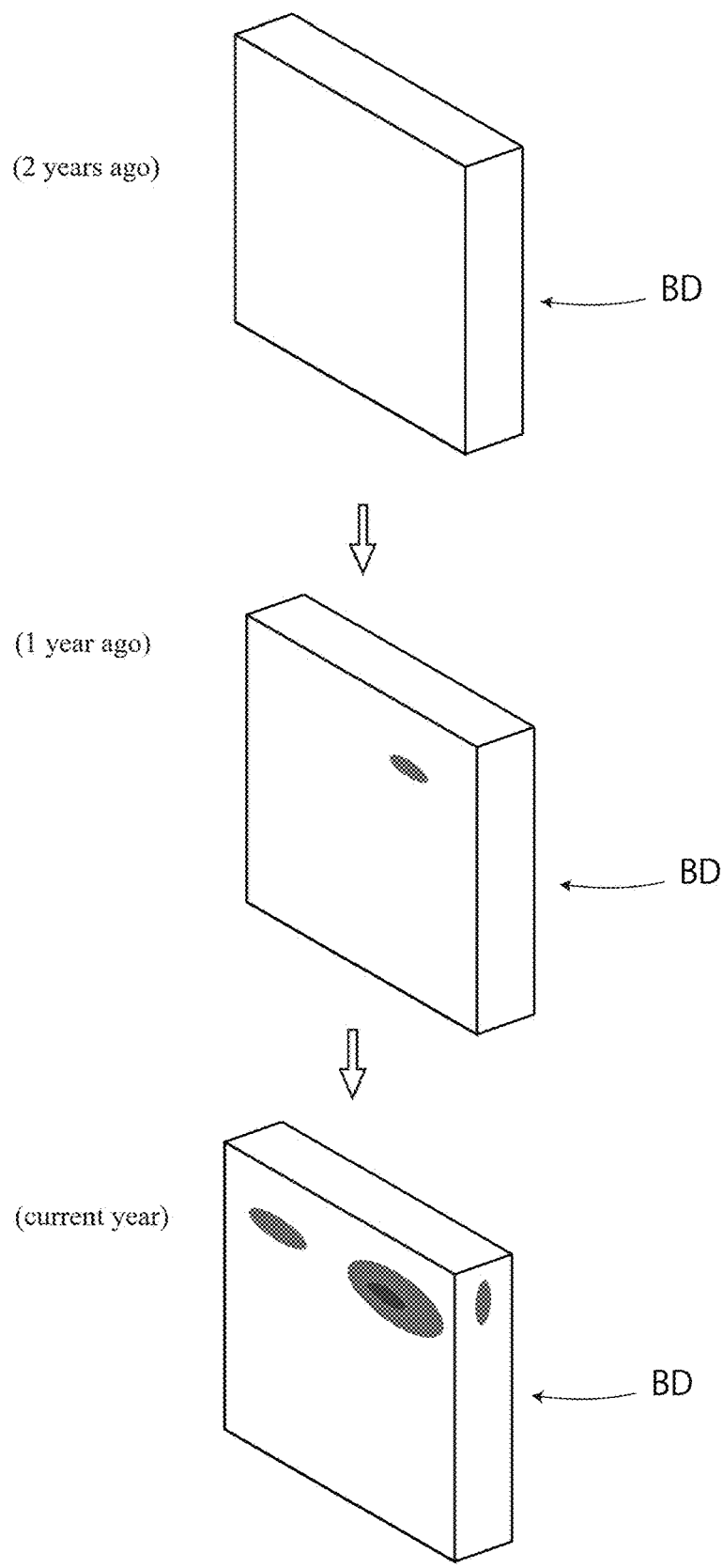
FIG. 13 illustrates an example of a hammering test result.

FIG. 13 illustrates another example of data to be displayed on the display unit 62 after post-processing. In FIG. 13, data of the same test object acquired in different test years are displayed in parallel. Hammering test results 2 years ago, 1 year ago, and a current year are displayed in order from an upper side. In this way, by comparing the states of the test object B at different hammering test times, deterioration due to aging can be visualized. It is also preferable that the states are displayed in order at predetermined time intervals like animation.

The hammering test device 4 is an air vehicle, and the hammering test system 1 can be used even when a test object is a column or a tunnel.

Figure 14A:
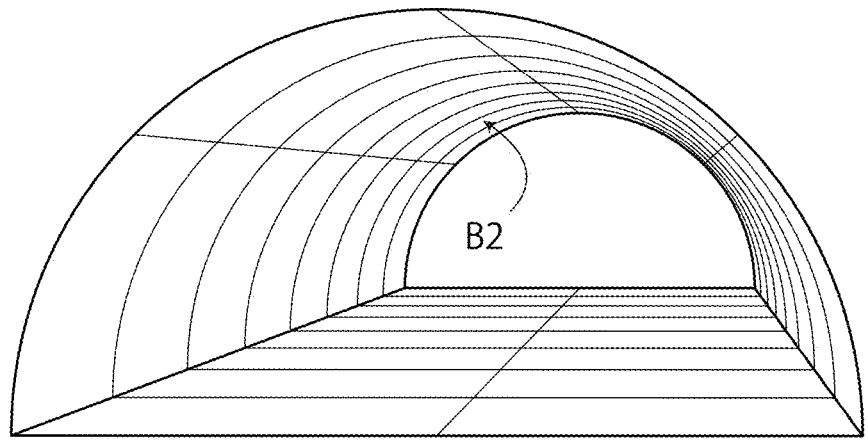
FIGS. 14A, 14B, and 14C illustrate another hammering test example with a hammering test system.
Figure 14B:
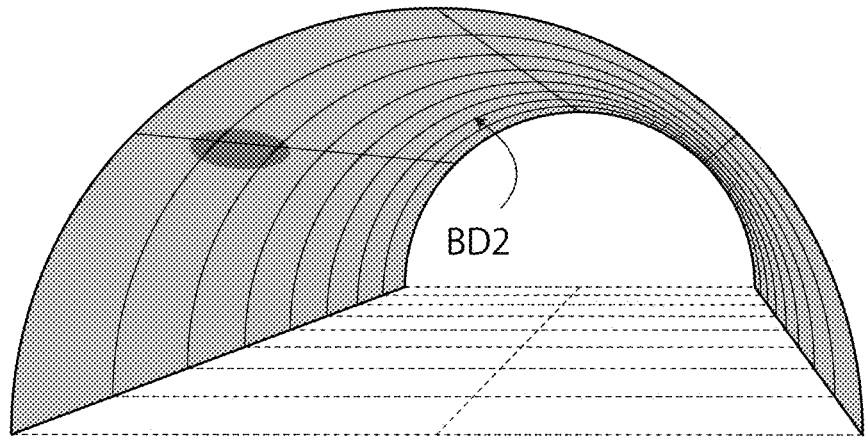
Figure 14C:
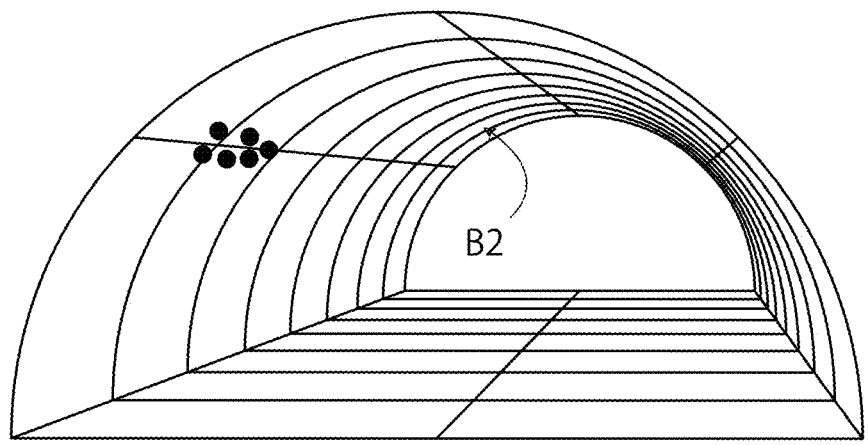

FIGS. 14A, 14B, and 14C illustrate an embodiment of the hammering test system 1 when a test object B2 is a tunnel. FIG. 14A illustrates a tunnel as the test object B2. The surveying instrument 2 is disposed at a known point inside the tunnel, scanning is performed, and from acquired three-dimensional point cloud data, a test object BD2 as tunnel shape data is calculated. A flight plan is calculated, and the hammering test device 4 is caused to automatically fly and conduct a hammering test.

FIG. 14B illustrates the test object BD2 as data and hammering test results displayed on the display unit 62 after the hammering test. The calculated test object BD2 is colored in gray. A road surface that does not have to be tested is omitted. A portion determined to be abnormal is displayed in darker gray.

FIG. 14C illustrates a tunnel after the test. Test points (hammering points) determined to be abnormal through the hammering test are provided with markings.

As illustrated in FIGS. 14B and 14C, even when a test object is a tunnel, the hammering test system 1 can be applied, and both from data and a site, an abnormal portion is visualized, and the abnormal portion is recognizably indicated to an inspector. The hammering test is automatically conducted thoroughly by automatic flight of the hammering test device 4. Therefore, the test is conducted without any problem even inside a tunnel that is a dark place. A worker re-tests portions with markings in detail and repairs them. In addition, the re-test after the repair can also be easily conducted. In this way, the total number of work processes can be significantly reduced. The tunnel shape and three-dimensional coordinates of an abnormal portion are also grasped. Therefore, the portion with a problem can be intensively tested by a test in the following year. Alternatively, the hammering test system 1 can be applied to conduct a hammering test not only at a tunnel but also in a dark place or at night.

Preferred embodiments of the present invention have been described above, and the embodiments described above are just examples of the present invention. For example, it is also possible that the determining unit 491 is installed in the arithmetic processing unit 65 of the processing PC 6, analyses and determinations are made by the processing PC 6 with high arithmetic processing performance, and only information showing whether there is an abnormality is transmitted to the device control unit 49.

Such modification and a combination of embodiments can be made based on the knowledge of a person skilled in the art, and such modified or combined embodiments are also included in the scope of the present invention.

REFERENCE SIGNS LIST

1: Hammering test system
2: Surveying instrument

4: Hammering test device
6: Processing PC(Computer)
30: Scanner
41: Flying unit
50: Hammering test mechanism
65: Arithmetic processing unit
652: Point cloud data analyzing unit
653: Flight plan calculating unit
654: Hammering test post-processing unit
B: Test object
P: Test point
P1: Test point
PP: Test point
PR: Test point
Pn: Test point
T: Target

The invention claimed is:

1. A hammering test system comprising:
a hammering test device including a target, a flying unit, a hammering test mechanism configured to conduct a hammering test on a test object, and a sound pickup unit;
a surveying instrument including a scanner for acquiring point cloud data by scanning with scanning light, and configured to be capable of performing tracking and distance and angle measurements of the target; and
an arithmetic processing unit including a point cloud data analyzing unit configured to calculate shape data by analyzing point cloud data acquired by the scanner, and a flight plan calculating unit configured to calculate a flight plan of the hammering test device based on the shape data calculated by the point cloud data analyzing unit,
wherein the surveying instrument tracks the target of the hammering test device and makes distance and angle measurements at a timing synchronized with a timing of conducting a hammering test by the hammering test mechanism,
wherein the flight plan calculating unit sets test points to be subjected to a hammering test at intervals of a predetermined distance on a surface of the shape data, and calculates a flight plan in which a hammering test is conducted thoroughly on a surface of the test object,
wherein detection of an abnormal sound by the sound pickup unit in response to the hammering test on the test object is always interpreted as a detection of structural abnormality in the test object, and
wherein the flight plan calculating unit is further configured to change the flight plan upon detection of the structural abnormality in the test object.

2. The hammering test system according to claim 1, wherein the arithmetic processing unit includes a hammering test post-processing unit configured to process a hammering test result obtained by the hammering test device into visually recognizable information based on the shape data calculated by the point cloud data analyzing unit and data acquired by distance and angle measurements made by the surveying instrument.

3. The hammering test system according to claim 1, wherein the arithmetic processing unit includes a hammering test post-processing unit configured to process a hammering test result obtained by the hammering test device into visually recognizable information based on the shape data calculated by the point cloud data analyzing unit and data acquired by distance and angle measurements made by the surveying instrument.

4. The hammering test system according to claim 1, wherein the flight plan calculating unit changes the flight plan upon detection of an abnormality by reducing the predetermined distance between the test intervals.

5. The hammering test system according to claim 1, wherein the flight plan calculating unit changes the flight plan upon detection of an abnormality by assigning additional test points circumscribing the test point where the abnormality was detected.

6. The hammering test system according to claim 1, wherein the flight plan calculating unit changes the flight plan upon detection of an abnormality by repeating the hammering test on the test point where the abnormality was detected.

7. The hammering test system according to claim 1, wherein the flying unit includes a marking mechanism for marking a portion of the surface of the test object where a structural abnormality is detected.

8. The hammering test system according to claim 1, wherein the flying unit includes a plurality of landing rods extending from opposite sides that are adjustable such that the flying unit assumes a posture that is parallel to a surface of the test object where it is landed to perform a hammering test.

9. The hammering test system according to claim 1, wherein the flying unit includes a triaxial sensor for acquiring posture data of the flying unit with respect to the surface of the test object, and the hammering test device acquires the posture data synchronized with a timing of a hammering sound produced by the hammer.

10. The hammering test system according to claim 1, wherein the flying unit includes at least one detection sensor that detects obstacles on the test object that would interfere with the hammering test device such that the hammering test device avoids the obstacle.

11. The hammering test system according to claim 1, wherein the flying unit includes a 360° prism configured to retro-reflect light toward a direction opposite to an incident direction of the light such that the surveying instrument can track the flying unit.

* * * * *